(12) United States Patent
Overhultz et al.

(10) Patent No.: US 7,510,123 B2
(45) Date of Patent: Mar. 31, 2009

(54) RF CONTACT SIGNAL DETECTOR

(75) Inventors: Gary L. Overhultz, River Forest, IL (US); Gordon E. Hardman, Boulder, CO (US); John W. Pyne, Erie, CO (US)

(73) Assignee: Goliath Solutions, LLC, Chicago, IL (US)

( * ) Notice: Subject to any disclaimer, the term of this patent is extended or adjusted under 35 U.S.C. 154(b) by 262 days.

(21) Appl. No.: 11/281,859

(22) Filed: Nov. 17, 2005

(65) Prior Publication Data

US 2006/0178024 A1 Aug. 10, 2006

Related U.S. Application Data

(60) Provisional application No. 60/629,216, filed on Nov. 18, 2004.

(51) Int. Cl.
*G06K 19/06* (2006.01)

(52) U.S. Cl. .................. 235/492; 235/487; 235/380; 235/451

(58) Field of Classification Search .......... 235/492, 235/441, 451, 380, 439, 435, 446, 487, 385, 235/382; 340/572.1
See application file for complete search history.

(56) References Cited

U.S. PATENT DOCUMENTS

| | | | |
|---|---|---|---|
| 6,104,311 A * | 8/2000 | Lastinger ............. 340/10.51 |
| 6,552,663 B2 | 4/2003 | Swartzel et al. |
| 2002/0075656 A1 | 6/2002 | Hastings et al. |
| 2004/0056091 A1 | 3/2004 | Overhultz et al. |
| 2004/0089717 A1 * | 5/2004 | Harari et al. ............. 235/441 |
| 2004/0144842 A1 * | 7/2004 | Brignone et al. ........ 235/385 |
| 2005/0040934 A1 | 2/2005 | Shanton |
| 2005/0174239 A1 * | 8/2005 | Shanks et al. .......... 340/572.1 |
| 2005/0234778 A1 * | 10/2005 | Sperduti et al. ............ 705/22 |
| 2005/0263591 A1 * | 12/2005 | Smith ..................... 235/385 |

* cited by examiner

*Primary Examiner*—Edwyn Labaze
(74) *Attorney, Agent, or Firm*—Jones Day

(57) ABSTRACT

A contact-based system for inexpensively monitoring the presence, location, and timing of various advertising and merchandising materials at a variety of retail facilities has been disclosed. This includes sign holders, display holders, stocking section identifiers, and the like that contain a plurality of contact point sensors that match or mate with contacts positioned on the material to be monitored. Identifying contacts are placed on the material to be monitored at a factory such that when they are inserted into a pre-specified location at a facility, contact is made. The contact data is then decoded data and relayed wirelessly to a device at the facility that in turn relays the data to a remote server to determine if the merchandising materials have been positioned in that facility and at a plurality of facilities at the right place and at the right time.

16 Claims, 4 Drawing Sheets

RF CONTACT SIGNAL DETECTOR

CROSS REFERENCE TO RELATED APPLICATION

This application claims the benefit of U.S. Provisional Patent Application Ser. No. 60/629,216, filed on Nov. 18, 2004, which is assigned to the assignee of the present application. The applicants are claiming priority to this provisional application, making the effective filing date of this application Nov. 18, 2004.

1. FIELD OF THE INVENTION

The present invention relates in general to object detection systems and in particular to a system for inexpensively monitoring and reporting presence of objects, such as signs, having at least one coded multi-contact point (e.g. 9, 12,18, and the like) sensor that matches certain contact point sensors associated with an RFID tag such that the tag can identify the object by virtue of its code and transmit the data to a remote location.

2. DESCRIPTION OF THE RELATED ART

As described and claimed in commonly assigned published co-pending patent application S.N. US 2004/0056091, published May 25, 2004, incorporated herein in its entirety by reference, it is common to monitor Point-of-Purchase (POP) sales displays or otherwise monitor advertising signs, or marketing materials displayed at gas stations, convenience stores, grocery stores, mass merchandising outlets, drug stores, specialty small outlets, consumer electronic stores, and the like.

It would be advantageous to have the ability to inexpensively monitor and report presence of displays.

SUMMARY OF THE INVENTION

The present invention greatly reduces the costs of prior art systems for monitoring the presence of displays in a product sales facility.

The term "object" or "display", as used herein, is intended to cover signs of all types, temporary and permanent displays, containers, advertising material, stock-alert sensors, merchandising material, category section markers, individual products, or other materials, such as point-of-sale products, desired to be monitored by retailers or manufacturers.

Each object may hold a number of smaller items such as multiple signs, other displays, multiple product containers or products, and the like, and has at least one, and preferably a plurality of, coded contacts that match certain complementary contact sensors mounted on, or associated with, a contact RFID tag. The contacts on the object and the tag are preferably electrically conducting, although other methods could be used such as light beams and reflections. When contact is made between the object contacts and the tag contacts, the object contacts are decoded and a signal is generated and transmitted wirelessly to a reader in the facility that indicates the presence (or absence) of the object among other data, as desired.

Of course, a plurality of objects could be monitored in a given location by only one RFID tag.

With a plurality of contacts on the object, some of the contacts can be omitted thereby creating a code that can not only identify the presence (or absence) of the package but can also provide other information such as the identity of the object and its contents. As stated previously, the object may be a sign, and, in this case, refers to the full complement of advertising and merchandising materials to be monitored. The objects are preferably pre-packaged with the coded contacts thereon. The contacts are, preferably, any type of metal contacts such as, but not limited to, powdered aluminum, conductive ink, foil, printed conductive patterns, copper, male and female receptacles, and the like.

To be economical, the contacts are coded preferably by a particular separation, or spacing, between contacts. Also, the RFID tag utilizes contact technology for connection to the object contacts, a decoder chip for identifying the objects and providing other information such as contents, date of installation, location, and the like.

In another embodiment, the system monitors retail store shelf layouts and reset compliance. Since store plan-o-grams change periodically, it is also desirable to know which stores have complied with a new layout at any given time. A plurality of identifier contact plug-in sockets, or female connections, are uniquely numbered and permanently affixed every few feet to the tops of gondolas or other shelves that hold product, consumer information, or merchandizing material. A chip embedded into each socket or connection may store an identifier code that is conveyed to an RFID tag through contacts and combined with the tag ID to show the category/subcategory product that is stored in each location.

The contact tag has a battery, a processor chip, a transmitter chip, and an antenna.

Thus, it is an object of the present invention to provide a low-cost object monitoring system.

It is also an object of the present invention to provide a low-cost object monitoring system that uses contact backscatter tags that mate with corresponding contacts on the object to be monitored.

It is still another object of the present invention to code the contacts on the object to be monitored with information such as object contents, object location, time that object was placed in the location, and the like.

It is another object of the present invention to utilize a single contact RFID tag that will monitor a plurality of objects in a given location.

It is yet another object of the invention to provide a system in which retail store shelves are remotely monitored for shelf layouts and reset compliance.

Thus, the present invention relates to an RF contact tag signal detection system comprising at least one object to be monitored; at least one contact associated with the object to generate data that at least identifies the object; at least one multi-contact sensor physically contacting the at least one contact associated with the object to read the generated data; and an RFID transmitter coupled to the at least one multi-contact sensor for transmitting the sensed object data to a remote location for monitoring.

The invention also relates to a method of detecting data related to an object comprising the steps of associating at least one contact with the object to generate data that at least identifies the object; physically contacting the at least one contact associated with the object with at least one multi-contact sensor to read the generated data; and coupling an RFID transmitter to the at least one multi-contact sensor for transmitting the sensed object data to a remote location for processing. The tags may be active or semi-passive.

BRIEF DESCRIPTION OF THE DRAWINGS

These and other more detailed objects of the invention will be more fully described when taken in conjunction with the following Detailed Description of the Drawings in which like numerals represent like objects and in which.

DETAILED DESCRIPTION OF THE DRAWINGS

The system disclosed hereafter will be a value to retailers as well as manufacturers through its ability to inexpensively monitor and report presence of displays that are placed into pre-specified locations. In particular, the "tag" has a multi-bit contact configuration with the ability to mate with pick-up contacts having coded information that is decoded and passed to an Active Transmitter Tag (ATT) or a semi-passive tag that then transmits the information directly to a hub for processing.

As stated earlier, as used herein, the term "object" or "display" is intended to cover signs of all types, permanent displays, containers, advertising materials, stock-alert sensors, merchandising material, category section markers, individual products, or other materials, such as point-of-sale products, desired to be monitored by retailers or manufacturers.

Figure 1:
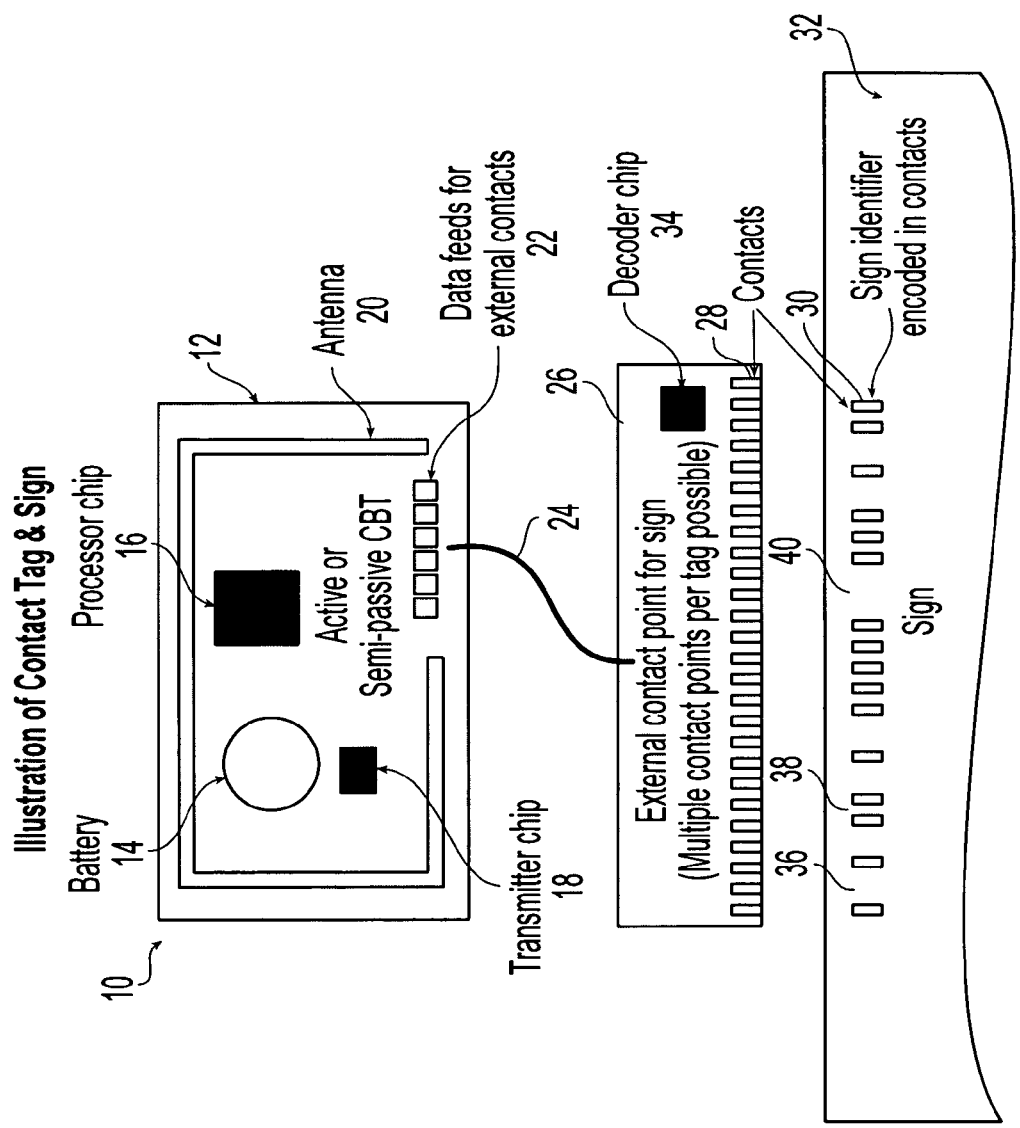
FIG. 1 is a schematic representation of a contact backscatter tag, its associated contacts and decoder chip, and a portion of an object with coded contacts thereon.

FIG. 1 is a schematic representation of the novel Tag and sign detection system of the present invention. The system 10 includes a contact tag 12 that may be an active or semi-passive tag. The tag 12 comprises a power source such as battery 14, a processor chip 16, a transmitter chip 18, and an antenna 20. A plurality of data feeds 22 are connected by cable 24 to an external contact point 26 for contact connection via contacts 28 with coded contacts 30 on an object 32 such as a sign, for example only. In some cases, the data feeds 22 may be directly connected to the tag 12 without a cable 24. A decoder chip 34 on the contact point 26 decodes the information in coded contacts 30. The code is fixed in any well known manner such as by the spacing 36, 38, and 40 between contact fingers 30, holes in foil, patterns of printed conductive material, and the like. The code could also be conveyed through notches or holes in material that would otherwise be conductive.

This code could represent any one or all of sign ID, sign location, product associated with the sign, and the like.

The decoded information is preferably passed to an Active Transmitter Tag (ATT), although a semi-passive tag also could be used, which then transmits the detected information directly to a hub. By by-passing "readers", both installation and component costs are reduced, and by using an ATT as the "reader", costs of operation can be further reduced. One tag can monitor several contact points that are proximal or adjacent to each other, such as multiple locations on a rack or gondola. Further, the "identifier" in this case is any object that closes the connection between contact points, and becomes an inexpensive multi-bit encoded contact system that could conceivably be brought down in price to that of a simple piece of aluminum foil that is cheaply and easily "blown" onto displays or signs. Through processes well known in the art, the number of contacts can be reduced to a number less than the number of bits in the object identifier.

As can be seen, then, in FIG. 1, the RF contact tag detection system 10 has at least one object 32, such as a sign, with at least one contact 30 associated with the object 32 to generate data that at least identifies the object 32. At least one multi-contact sensor 26 physically contacts the at least one contact 30 associated with the object 32 to read the generated data and an RFID transmitter tag 12 is coupled to the at least one multi-contact sensor 26 for transmitting the sensed object 32 data to a remote location for processing.

Figure 2:
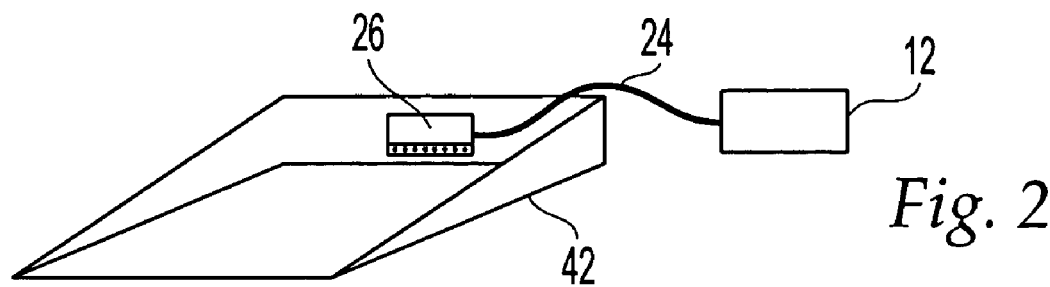
FIG. 2 is an illustration of an object-holding or retaining device having a contact receiver and decoder associated therewith and with the contact receiver coupled to a Contact Backscatter Tag (CBT)
Figure 3:
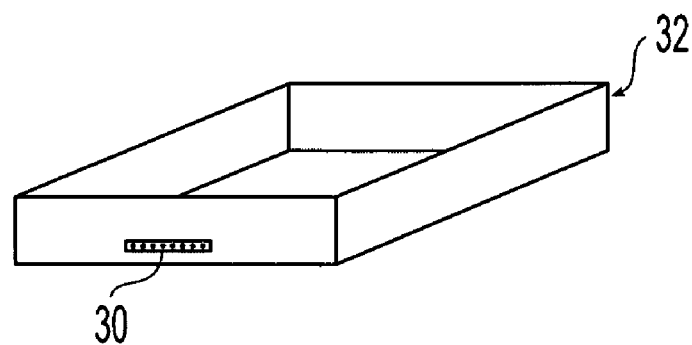
FIG. 3 illustrates schematically an object/object holder that has coded contacts preprinted thereon for making physical contact with the contacts coupled to the CBT as shown in FIG. 1.

The object 32, such as a sign or product container, may be placed in a holder or rack 42 as shown in FIG. 2. As shown in FIG. 2, holder 42 has external contact point sensor 26, shown in FIG. 1, mounted on or attached to, holder or rack 42. When the sign or product container 32, shown in FIG. 3, is placed in holder or rack 42, it has pre-manufactured coded contacts 30 thereon that matingly contact the external contacts 28 that function as previously described in relation to FIG. 1. The coded information is then transmitted over connection 24 to the transmitter tag 12 for transmission to a hub.

Figure 4:
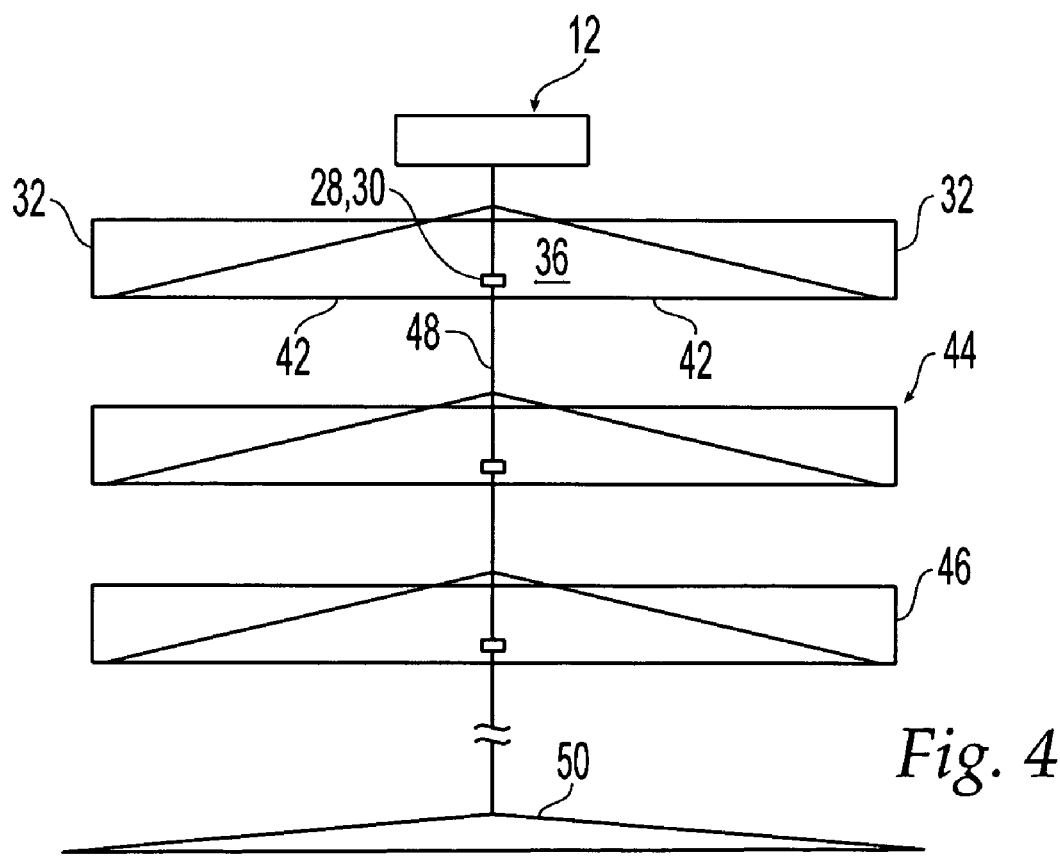
FIG. 4 schematically represents a post or mount of any known type on which multiple object-holding or retaining devices are mounted.

Obviously, a plurality of the holders (or shelves or racks) 42 could be attached to a post 48 as shown in FIG. 4 and each of the holders has its own object, such as a sign, display, or product container 32 mounted therein as described above. Thus, not only the top rack or holder 42 shown in FIG. 4 could have objects 32 but also the middle holder 44 and the bottom holder 46. As shown in the top holder, contacts 28/30 on the holder 42 and objects 32 are such that they make mating contact when the object 32 is placed in the holder 42. The post or other type of mount 48 could be attached to a base 50 for stability and could have a single tag 12 mounted any convenient place on post 48 but is shown in FIG. 4 at the top thereof.

Thus, as shown in FIG. 4, the holder 42 has contacts 26 attached to it in any well-known manner and the object 32 has coded contacts 30 pre-positioned to enable the coded contacts 30 to make physical contact with the contact points 28 associated with tag 12.

The system 10 also includes a plurality of shelves or holders 42, 44, and 46 as shown in FIG. 4 such that each shelf 42, 44, and 46 receives its own object 32, which feed information to tag 12.

As stated earlier, the system 10 provides multiple contacts associated with the object 32 that are coded to at least identify the object and the multi-contact sensor that read the code associated with the object 32 to at least identify the object 32 and the tag 12 that read it. This association and its significance is made by a remote server that contains additional information about the identification code of each tag 12, data detected through the contacts 26 associated with each tag 12, and the object 32 associated with the encoded conductive material 30 that has been placed on it.

The preferred RFID tag is an active transmitter tag (ATT) and the tag 12 is mounted on or near the rack or holder 42 (and 44 and 46 where there are multiple shelves).

In the embodiment shown in FIG. 4, the contacts 28 associated with tag 12 and the contacts 30 associated with the object 32 or product container 30 can be male and female mating contacts with either set of contacts being the male contacts and the other set of contacts being the female contacts. One skilled in the art would know how to mount the respective contacts to enable easy mating.

The advantage of a multiple rack display is that it permits quick change out of different or replacement products (often referred to as "PDQ's" in the retain industry, while preserving the read component of the display rack.

Another retail issue is to be able to remotely monitor retail store shelf layouts and reset compliance. In particular, sales variance is believed to be due to stocking adjacencies or location in some cases. For example, placing antacids next to diarrhea medicine may create more sales than putting them next to stomach remedies.

Further, store plan-o-grams change periodically and it is desirable to know which stores have complied with a new layout at any given time.

Figure 5:
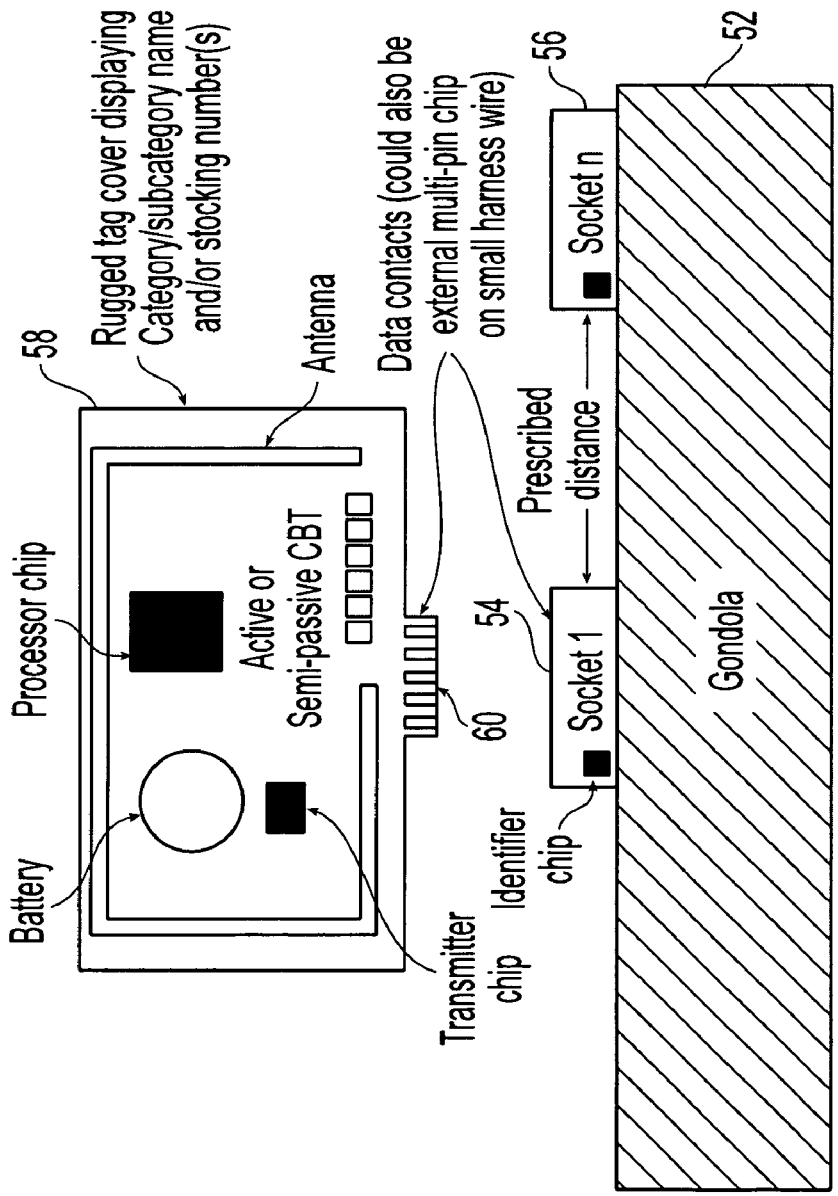
FIG. 5 illustrates schematically a system for using a CBT to monitor stocked item shelf layout, such as adjacent stocked items, and reset compliance.

These issues can be addressed by placing identifier "sockets", uniquely numbered sequentially and permanently affixed at spaced locations to the top of each in-store gondola, product area, or shelving unit. For example, a store having 10 gondolas that are each 75 feet long could have sockets placed every three feet atop them. In such a case, 250 uniquely-numbered sockets would be permit the monitoring of all key locations along the gondolas. Then, 250 unique ID codes (one for each socket) could be mapped into 9 contacts or data bits. These ID's could easily be stored in a chip embedded in the socket and conveyed to an associated tag by means of physical contact with a tag. Such a system is shown in FIG. 5 in which a gondola 52 has a plurality of spaced sockets 54 and 56 (numbered 1-n). A transmitter tag 58 (similar in operation to the tag shown and described in relation to FIG. 1) having male plug-in data contacts 60 is inserted in the associated female socket 54 or 56. As stated above, the sockets contain an ID code. The tag 58 also has an ID. The combination of the tag ID and the socket ID, when transmitted together, shows which category/sub-category is stocked in a given location.

Figure 6:
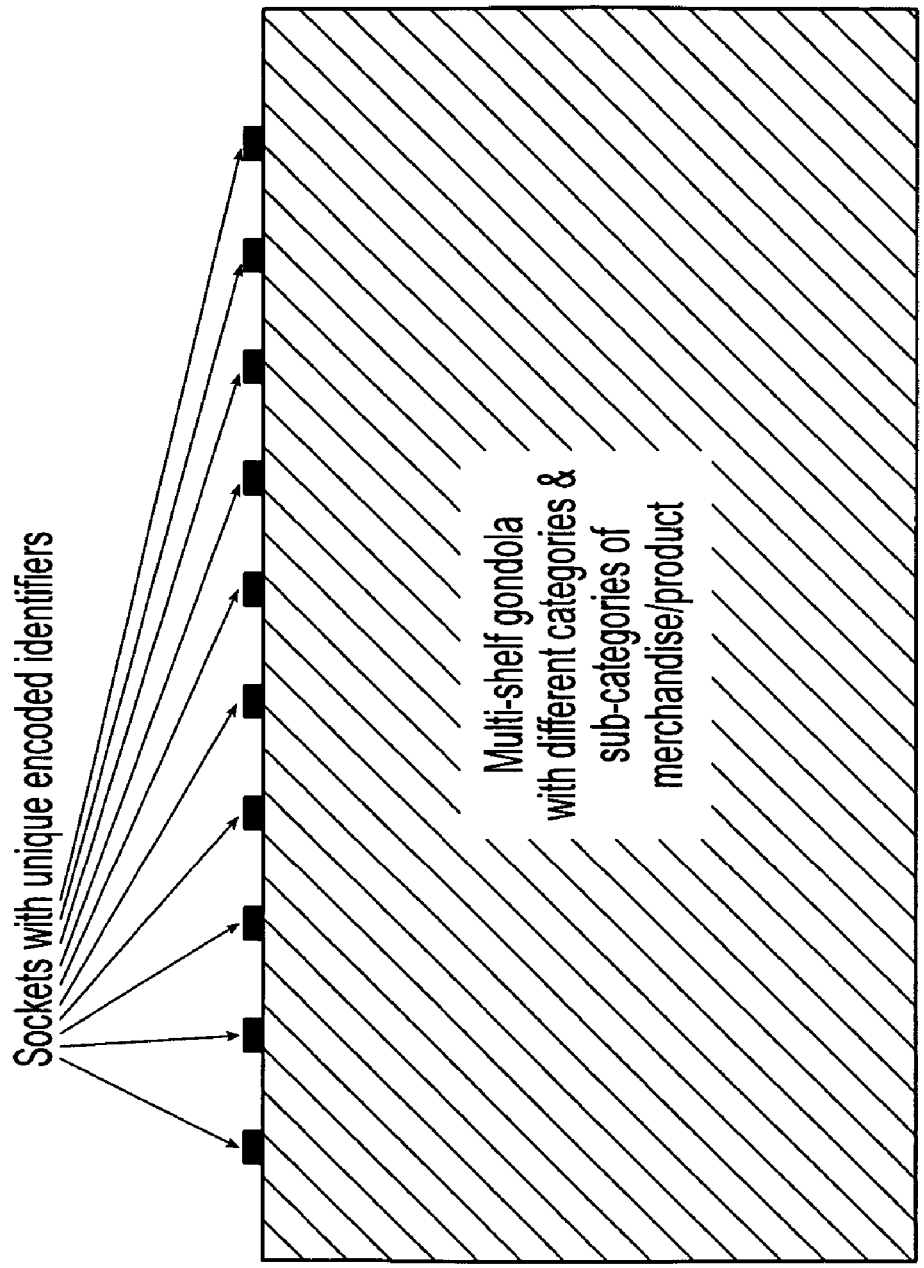
FIG. 6 is a schematic representation of a multi-shelf gondola holding different categories and sub-categories of merchandise/product that are monitored by the sockets with unique, encoded identifiers.

A larger format store with thousands of locations could be covered with 12 (or more) data bits associated with the various sockets that are positioned in the locations to be monitored. Alternatively, socket ID's may be derived from any unique randomly pre-encoded chip with a much larger bit structure. Regardless, socket ID's would be mapped into adjacent positions on the gondola as well as overall in-store position (e.g. aisle 9, mid-store) when entered into a database on the remote server. See FIG. 6 for a schematic representation of a multi-shelf gondola with different categories and sub-categories of merchandise/product that are monitored by a multiplicity of sockets, each with a uniquely encoded identifier for each shelf/product.

Similarly, the ID from an active or semi-passive Contact Backscatter Tag (CBT) that is assigned to each sub-category or stocking section in the store plan-o-gram is entered into the remote data base server, and a label for that tag's category/sub-category is applied to the outside of the tag. When a section is reset, store personnel remove prior CBT's and insert the proper CBT into the socket closest to reset stock described by that tag's label. Multiple CBT's can be assigned to a given category/sub-category to reflect wide sections on the shelves. An inventory of surplus category/sub-category labels is provided to stores for use at any point in time as long as their codes have been pre-entered into the remote server's data base.

Continuing the example illustrated in FIG. 5 and discussed above, one or more "antacid" CBT's 58 have male contacts 60 inserted into female socket 54 that is hypothetically assigned to the 4$^{th}$ position on gondola 52. When the shelves are reset, "Diarrhea Remedies" CBT's are inserted into adjacent socket 56 on the same gondola. A proximal Backscatter Reader/Transmitter (BRT) periodically reads the CBT's for both categories and passes along the combined socket/CBT identifiers to the hub, which in turn, passes the ID's to the remote server for interpretation and reporting. Section adjacencies and locations are then reported and/or compared with plans. If a CBT is detected by multiple BRT antennas, the primary means of detecting location is the socket ID and its associated location as noted on the server.

Sockets should be inexpensive and low-profile with contacts that mate easily and robustly with the CBT's. The sockets, for example only, may have female contacts that receive mating male contacts on the CBT in a removable plug-in fashion. Semi-passive CBT's, if used, would utilize power from the tag to "read" the ID of the socket into which they have been placed and would reflect the concatenated socket identifier with tag's identifier. Sleep cycles on the tags (know in the art and described in applicant's prior applications) could be used to enhance battery life because they would only need to report one or two times a day (shelf resets occur infrequently). Placement of the CBT's on the gondola tops would facilitate read reliability. Semi-passive CBT's are preferable to Active Transmitter Tags (ATT's) for this application because they are much less expensive. However, any functional tag could be utilized.

It will be understood by those skilled in the art that socket ID's could be derived from any unique randomly pre-encoded chip with a much larger bit structure. Further, the ID from an active or semi-passive Contact Backscatter Tag that is assigned to each sub-category (or stocking section) in the plan-o-gram of a store would be entered into a remote database server, and a label for that tag's category/sub-category would be applied to the outside of the tag. When a gondola or product section is reset or restocked, personnel doing the restocking would be charged with removing prior CBT's and inserting the proper new CBT into the socket to identify the stock described by the new CBT label. Multiple CBT's can be assigned to a given category/sub-category to reflect wide sections of associated products on the shelves. The only requirement is that the CBT label has its code entered into the remote server's data base.

Thus, there has been disclosed a novel system for inexpensively monitoring and reporting the presence of objects, such as signs, having at least one coded multi-contact point (e.g. 9, 12, 18, and the like) sensor that matches certain contact point sensors associated with an RFID tag such that the tag can identify the object by virtue of its code and transmit the data to remote location. As well as a system for noting location and adjacencies of multiple product/product locations.

While particular embodiments of the invention have been shown and described in detail, it will be obvious to those skilled in the art that changes and modifications of the present invention, in its various embodiments, may be made without departing from the spirit and scope of the invention. Other elements, steps, methods, and techniques that are insubstantially different from those described herein are also within the scope of the invention. Thus, the scope of the invention should not be limited by the particular embodiments described herein but should be defined by the appended claims and equivalents thereof.

The invention claimed is:

1. An RF contact tag signal detection system comprising:
   at least one location for receiving an object;
   at least one object contact associated with an object to generate data that at least identifies the object;
   at least one multi-contact sensor on the at least one location physically contacting the at least one object contact to read the object generated data; and an RF identifier associated with the location and coupled to the at least one multi-contact sensor for relaying the sensed object data to a receiver within the facility;

wherein the at least one contact associated with the object container further comprises:

a socket forming part of the object container and having spaced multiple electrical contacts being arranged to form a code that at least identifies the object in the object container.

2. The system of claim 1 wherein the RF identifier is an Active Transmitter Tag (ATT).

3. The system of claim 1 wherein the RF identifier is a semi-passive tag.

4. The system of claim 1 wherein the object is pre-coded on at least one object container to enable the object to be placed in a predetermined location in a facility.

5. The system of claim 1 wherein the object physically contacting at least one contact on the sensor is used to determine if the object is placed in the proper location in a facility at the proper time.

6. The system of claim 1 wherein the object is a pre-coded display, sign, product, product container, product or category section marker, advertisement, or other merchandising material to be placed in the facility.

7. The system of claim 1 wherein the location is a single sign holder, shelf, rack, display holder, product container, or specific merchandising area or sub-area at a retail facility.

8. The system of claim 7 wherein the RF tag is mounted on or near the object container.

9. The system of claim 1 wherein the location is a plurality of proximal sign holders, shelves, racks, display holders, product containers or specific merchandising areas or sub-areas at a retail facility.

10. The system of claim 1 further including:
a rack; and
a plurality of shelves on each rack such that each shelf defines a location to receive at least one packaged product container carrying an object contact.

11. The system of claim 1 wherein:
multiple contacts are associated with the prepackaged product container.

12. An RF contact tag signal detection system comprising:
at least one location for receiving an object;
at least one object contact associated with an object to generate data that at least identifies the object;
at least one multi-contact sensor on the at least one location physically contacting the at least one object contact to read the object generated data; and
an RF identifier associated with the location and coupled to the at least one multi-contact sensor for relaying the sensed object data to a receiver within the facility
wherein multiple contacts are associated with the prepackaged product container;
wherein the multiple contacts associated with the object are coded to at least identify the object; and
the multi-contact sensor reads the code on the object container to at least identify the object in the container.

13. The system of claim 12 wherein the at least one multi-contact sensor on the object container further comprises:
a mating pickup sensor for contacts forming part of the object when the container is placed in the pre-specified location which contains the sensor for reading the code and the RF means for relaying the code to a receiver in the facility.

14. An RF contact tag signal detection system comprising:
at least one gondola for holding products;
identifier sockets permanently affixed at spaced locations on the gondola;
a data storage chip embedded in each of the sockets for storing binary data representing the ID of the given location to be stocked with a product on the gondola; and
a Contact Backscatter Tag (CBT) storing binary ID data representing the category or sub- category of the products stocked in given areas on the gondola such that the combination of the tag ID and the socket ID indicates which category/sub-category product is stocked in a given area on the gondola.

15. The system of claim 14 further comprising:
encoded contacts associated with each of the sockets;
contacts on the CBT for mating with the contacts on each of the sockets for deriving the code therefrom; and
a remotely located backscatter reader/transmitter (BRT) for periodically reading the CBT's associated with the category/sub-category products stocked in the given location on the gondola.

16. A method of inexpensively monitoring and reporting presence of displays containing product placed into pre-specified racks comprising the steps of:
mating a rack pick-up element having a plurality of electrical contacts with a display coding socket to generate a decoded signal representing at least the product contained in the display;
coupling the decoded signal to a tag for relaying the decoded data to a remote location for processing.

* * * * *